United States Patent
Böhm

(10) Patent No.: US 12,395,102 B2
(45) Date of Patent: Aug. 19, 2025

(54) METHOD FOR HOLDING A MOTOR VEHICLE IN PLACE AND ELECTRICALLY ACTUATED BRAKE

(71) Applicant: Continental Automotive Technologies GmbH, Hannover (DE)

(72) Inventor: Jürgen Böhm, Oberneisen (DE)

(73) Assignee: Continental Automotive Technologies GmbH, Hannover (DE)

( * ) Notice: Subject to any disclaimer, the term of this patent is extended or adjusted under 35 U.S.C. 154(b) by 74 days.

(21) Appl. No.: 18/256,931

(22) PCT Filed: Nov. 4, 2021

(86) PCT No.: PCT/DE2021/200175
§ 371 (c)(1),
(2) Date: Jun. 12, 2023

(87) PCT Pub. No.: WO2022/128005
PCT Pub. Date: Jun. 23, 2022

(65) Prior Publication Data
US 2024/0072691 A1    Feb. 29, 2024

(30) Foreign Application Priority Data

Dec. 14, 2020  (DE) .................. 10 2020 215 854.1

(51) Int. Cl.
*H02P 3/04* (2006.01)
*B60T 8/171* (2006.01)
*B60T 8/172* (2006.01)
*B60T 13/74* (2006.01)

(52) U.S. Cl.
CPC ............... *H02P 3/04* (2013.01); *B60T 8/171* (2013.01); *B60T 8/172* (2013.01); *B60T 13/74* (2013.01); *B60T 2270/84* (2013.01)

(58) Field of Classification Search
CPC .......... H02P 3/04; B60T 8/171; B60T 8/172; B60T 13/74; B60T 2270/84
USPC ................................................ 318/372, 362
See application file for complete search history.

(56) References Cited

U.S. PATENT DOCUMENTS 7,890,240 B2 * 2/2011 Karnjate ................ B60T 7/06
  73/132
9,630,606 B2 * 4/2017 Bareiss ................ B60T 13/745

FOREIGN PATENT DOCUMENTS

| DE | 102016220752 A1 | 4/2018 |
| DE | 102017217413 A1 | 4/2019 |
| EP | 3118076 A2 | 1/2017 |

OTHER PUBLICATIONS

English translation of German Search Report dated Jun. 18, 2021 for the counterpart German Patent Application No. 10 2020 215 854.1.
(Continued)

*Primary Examiner* — David Luo

(57) ABSTRACT

A method and apparatus for holding a motor vehicle by means of an electrically actuated brake comprises applying the brake until a target force is reached. For holding purposes, a motor torque is reduced by applying a negative preset value for a target angular velocity for a motor torque of an electric actuator of the brake.

22 Claims, 1 Drawing Sheet

(56) References Cited

OTHER PUBLICATIONS

English translation the International Search Report and the Written Opinion of the International Searching Authority mailed Jan. 24, 2022 on for the counterpart PCT Application No. PCT/DE2021/200175.

European Examination Report dated Jun. 27, 2025 for the counterpart European Patent Application No. 20 806 988.8 and machine translation of same.

\* cited by examiner

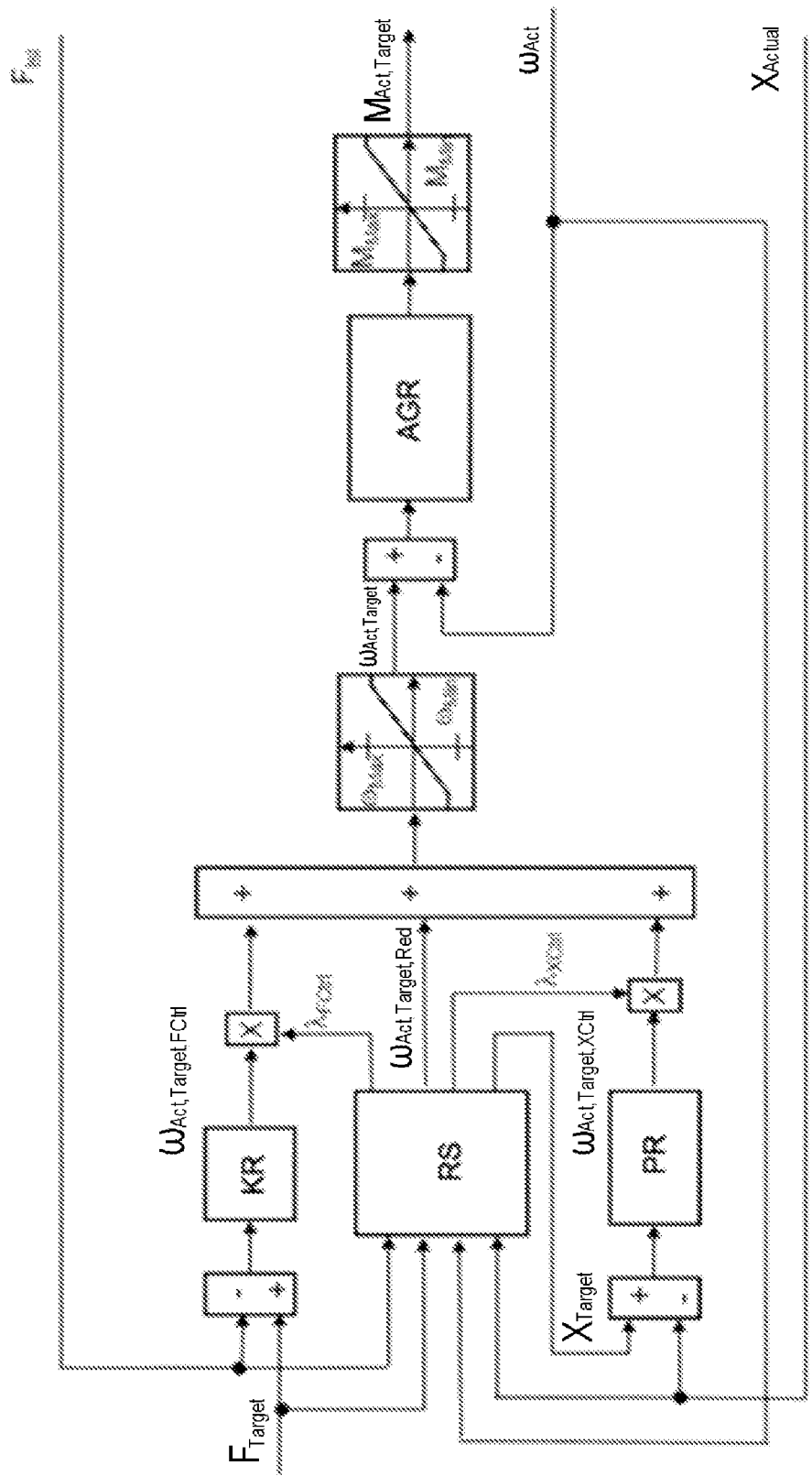

METHOD FOR HOLDING A MOTOR VEHICLE IN PLACE AND ELECTRICALLY ACTUATED BRAKE

TECHNICAL FIELD

The embodiments relate to a method for holding a motor vehicle by means of an electrically actuated brake and to an associated electrically actuated brake.

BACKGROUND

Electrically actuated brakes can be used, for example, to implement a dry braking system, i.e. a braking system for a motor vehicle in which hydraulics can be dispensed with. In this case, the electrically actuated brake receives an electrical signal and/or a suitable power supply and generates a clamping force upon request, a braking force resulting from said clamping force. Such an electrically actuated brake can be designed, for example, as a disk brake or as a drum brake.

It is fundamentally known that a motor torque of an electric actuator of an electrically actuated brake is controlled by means of an actuator speed controller depending on a difference between a target angular velocity and an actual angular velocity. In this case, the target angular velocity can originate, for example, from a force controller, which adjusts an actual clamping force to a target clamping force. As an alternative to using a force controller, a position controller, which adjusts an actual position to a target position, can also be used, for example.

A method is provided for holding a motor vehicle by means of an electrically actuated brake. The brake has an electric actuator. The motor torque of said electric actuator is determined by means of an actuator speed controller depending on a difference between a target angular velocity and an actual angular velocity. The method comprises the following steps: applying the brake until a target force is reached, applying a negative preset value for the target angular velocity, while monitoring the actual angular velocity of the actuator, and applying a quiescent value for the target angular velocity as soon as the actual angular velocity, in terms of magnitude, exceeds a threshold value.

Such a method can be used to implement a hold function for a motor vehicle by means of an electrically actuated brake, which consumes particularly little energy and exhibits particularly low material wear. By applying a negative preset value for the target angular velocity, the motor torque for a hold function is reduced to such an extent that it is just sufficient for this purpose.

The motor torque, which is determined by means of the actuator speed controller, is a motor torque to be set, for example. Said motor torque is then adjusted, for example, by another controller. Said motor torque can also be considered to be a target motor torque. For example, a target current intensity can be calculated or read from a table for each motor torque, the target current intensity then being adjusted by a current controller.

The electrically actuated brake may be, for example, a disk brake or a drum brake. An electric actuator typically has an electric motor, which produces a motor torque. The target force is typically a force that is specified such that the brake is reliably applied in order to execute a hold function. This target force for holding purposes is typically constant. As an alternative, other termination criteria could also be used. After application of the brake, the angular velocity is typically initially zero. If, after a certain time, the negative preset value causes the actuator to rotate again, the angular velocity, in terms of magnitude, becomes greater than zero. This can be detected by a simple sensor. If the angular velocity exceeds a specified threshold value, which can also be zero for example, the quiescent value is applied and the brake holds the vehicle while the motor torque remains at a minimum.

The actuator speed controller may have at least one integral part. As a result, after the target force specified for the hold function has been set by applying a negative preset value for the target angular velocity, the motor torque is continuously further reduced, until the actuator begins to move at least slightly. For example, the actuator speed controller can be a proportional-integral controller. It can control, for example, an angular velocity of the actuator. Proportional-integral controllers have been proven for typical applications. An additional differential part can also be used.

The preset value, in terms of magnitude, may be, for example, at most one revolution per minute. This has proven to be expedient for typical applications. However, other values are also possible here. The fact that the preset value is negative means, in particular, that it has a negative sign.

For example, the quiescent value can be zero. In this case, the input variable of the actuator speed controller no longer changes when the angular velocity of the actuator is likewise zero again. This can be the case, for example, due to friction. The actuator speed controller may receive a difference between the target angular velocity and the actual angular velocity as the input variable.

For example, the target angular velocity, depending on an operating state, can be the preset value or originate from a force controller. The target angular velocity, depending on an operating state, can also be the preset value or originate from a position controller. For example, provision can be made for the target angular velocity, depending on an operating state, to be the preset value, originate from a force controller or originate from a position controller. In this case, three different values can be used as the input for the actuator speed controller. In this case, the operating state can select which value is to be used. For example, a force controller can be used if a target clamping force is to be specified. A position controller can be used if a target position is to be specified or set. The preset value can be used if the functionality described herein of reducing the motor torque to hold the motor vehicle is to be implemented.

The force controller and/or the position controller can be, for example, a respective controller with a proportional action.

At the output end of the actuator speed controller, a limiter can, for example, limit the motor torque in such a way that it has at least a lower value and/or has at most an upper value. As a result, a motor torque to be used can be kept within an expedient range, which can be specified by the lower value and the upper value. Atypical values or values that should not be used can be avoided in this way.

At the input end of the actuator speed controller, a limiter can, for example, limit the target angular velocity in such a way that it has at least a lower value and/or has at most an upper value. Atypical values can also be avoided in this way. This limiter can be arranged, for example, between a force controller and the actuator speed controller and/or between a position controller and the actuator speed controller.

The holding process can be ended, for example, when a target clamping force or a target actuator position is changed. As a result, force control or position control can be reactivated, for example, and the quiescent value is no longer used. For example, corresponding input variables for the target clamping force and/or the target actuator position can be monitored, so that a change in said variables can be identified.

The method described herein can be executed for example, in response to an actual clamping force being greater than an activation threshold value, differing from a target clamping force at most by a specified threshold value and lying within a tolerance range at least for a predetermined period of time. As a result, a stationary state can be identified, which makes it appear expedient to carry out the method described herein for reducing the material stress and for reducing the electrical power consumption of the actuator. Owing to the use of an activation threshold value, it is possible to rule out the method being executed if the vehicle is moved for a relatively long time without braking.

The method can also be executed in response to an actual position exceeding a further activation threshold value, differing from a target position at most by a specified threshold value and being constant within a tolerance range at least for a predetermined period of time. A stationary state can also be correspondingly identified as a result.

The fact that the method is executed in response to a certain state can for example be understood to mean that the brake is applied as mentioned, the preset value is then applied and, after the angular velocity has exceeded the threshold value, the quiescent value is applied.

The embodiments further relate to an electrically actuated brake, which is configured to execute a method as described herein. With regard to the method, reference can be made to all of the embodiments and variants described herein.

An electrically actuated motor vehicle brake can have, for example, one or more brake shoes and a brake disk or a brake drum. It can also have an actuator which, in order to be driven, has an electric motor and which is designed to press the brake shoes against the brake disk or against the brake drum. Furthermore, the motor vehicle brake can typically have at least one clamping force sensor and/or one angle sensor. It can also have, for example, an electronic control device, which is configured to execute the method.

BRIEF DESCRIPTION OF THE DRAWINGS

Further features and advantages will be gathered by a person skilled in the art from the exemplary embodiment described below with reference to the appended drawing, in which:

FIG. 1 shows a control arrangement for an actuator.

DETAILED DESCRIPTION

FIG. 1 shows a control arrangement for an actuator of an electrically actuated brake. A force controller KR and a position controller PR are initially present at the input end here. As shown, the force controller KR receives as the input variable a difference between a target clamping force $F_{Target}$ and an actual clamping force $F_{Actual}$, wherein the former is specified and the latter is measured and adjusted. Here, for example, the force with which the linings are pressed against a brake disk or against a brake drum can be considered to be the clamping force. In a similar way, the position controller PR receives as the input a difference between a target actuator position $X_{Target}$ and an actual actuator position $X_{Actual}$.

The force controller KR generates as the output a target angular velocity $\omega_{Act,Target,FCtrl}$, which is multiplied by a first control signal $\lambda_{FCtrl}$ in a multiplier. The output signal of this multiplier is, in turn, passed to an adder. In a similar way, the position controller PR generates as the output signal a target angular velocity $\omega_{Act,Target,XCtrl}$ which is, in turn, passed to a multiplier and there multiplied by a further control signal $\lambda_{XCtrl}$. The output signal of the multiplier is passed to the same adder.

A controller selection RS is present for controlling the controller. As shown, said controller selection can generate the two control values $\lambda_{FCtrl}$, $\lambda_{XCtrl}$. Furthermore, said controller selection generates a preset value $\omega_{Act,Target,Red}$ as required, said preset value likewise being passed to the adder already mentioned. The controller selection RS receives as input variables the target clamping force $F_{Target}$, the actual clamping force $F_{Actual}$, the actual actuator position $X_{Actual}$ and an actual angular velocity $\omega_{Act}$, the latter being measured by means of a suitable sensor or being determined by differentiation of the actual actuator position $X_{Actual}$ of the actuator. Said controller selection likewise generates the target actuator position $X_{Target}$ already mentioned further above. Depending on the operating state, the controller selection RS can use its input variables to select whether an output signal of the force controller KR or the position controller PR is to be used, or whether the preset value $\omega_{Act,Target,Red}$ is to be used.

During normal driving operation, the target clamping force $F_{Target}$ is typically specified by a driver or a vehicle controller and evaluated by the controller selection RS. The force controller KR is typically used to implement a normal braking force request. The first control signal $\lambda_{FCtrl}$ A is accordingly set to one, and the second control signal $\lambda_{Xctrl}$ and the preset value $\omega_{Act,Target,Red}$ are set to zero. Only the force controller KR is therefore relevant. The output signal of said force controller is passed via the adder already mentioned to a limiter, which ensures that the target angular velocity $\omega_{Act,Target,FCtrl}$ generated is not smaller than a lower value $\omega_{Min}$ and not greater than an upper value $\omega_{Max}$. An interval is therefore specified, in which corresponding specifications can be judiciously further processed. The output signal of this limiter is then fed as the target angular velocity $\omega_{Act,Target}$ to a further subtractor, i.e. the actual angular velocity $\omega_{Act}$ already mentioned further above is subtracted from said target angular velocity. The output signal of this subtractor is then fed to an actuator speed controller AGR, which in the present case is a proportional-integral controller and the output signal of which, after passing through a further limiter, which limits the output signal between a lower value $M_{Min}$ and an upper value $M_{Max}$, is used as the target motor torque $M_{Act,Target}$. If this target motor torque $M_{Act,Target}$ is used correctly, the actuator generates the desired torque, which ultimately leads to the desired target clamping force $F_{Target}$ being set.

If, on the other hand, the controller selection RS identifies that the braking process has ended, the first control signal $\lambda_{FCtrl}$ can be set to zero and the second control signal $\lambda_{Xctrl}$ can be set to one. Accordingly, the force controller KR is deactivated and the position controller PR is activated. The target actuator position is set to a value that is to be approached, it being possible, for example, for the target actuator position to be a quiescent position in which there is no longer any contact between a brake shoe and a brake disk or a brake drum. The position controller PR then generates a target angular velocity $\omega_{Act,Target,XCtrl}$ which is suitable for this and which, as mentioned with reference to the force controller, is likewise forwarded via the adder and the limiter to the subtractor upstream of the actuator speed controller AGR and leads to a target motor torque $M_{Act,Target}$ which will ultimately lead to the desired target actuator position $X_{Target}$ being set. In this case, the actuator position is typically defined such that there is no contact between the lining and the brake disk or brake drum and a certain distance between the brake lining and the brake disk is set.

If the target clamping force $F_{Target}$ remains at a value which exceeds an activation threshold value for a relatively long period of time, and the actual clamping force $F_{Actual}$ is likewise at least largely constant for this period of time and hardly differs from the target clamping force $F_{Target}$, for example only differs within a certain interval, the controller selection RS identifies that a hold function is present. In this case, said controller selection sets both control signals $\lambda_{Fctrl}$, $\lambda_{Xctrl}$ to zero, so that both the force controller KR and the position controller PR are deactivated. For the preset value $\omega_{Act,Target,Red}$, a low negative value is output, which is forwarded to the actuator speed controller AGR via the adder, as already described further above. The integral component in the actuator speed controller AGR is successively reduced in the process, with a target motor torque $M_{Act,Target}$, which is ultimately aimed at at least slightly releasing the applied brake, being set. While the slightly negative preset value $\omega_{Act,Target,Red}$ is applied, the actual angular velocity $\omega_{Act}$ is monitored. If said actual angular velocity, in terms of magnitude, exceeds a threshold value, the preset value $\omega_{Act,Target,Red}$ is set to a quiescent value of zero again and releasing of the brake is thus stopped. Due to friction, the brake engages again and holds the vehicle stationary, with the measure just described of applying a negative preset value $\omega_{Act,Target,Red}$ reducing the applied motor torque to a value which is just sufficient to hold the vehicle, as a result of which the material stress is reduced. If there is an increase in the magnitude of the actual angular velocity $\omega_{Act}$, which can take place, for example, when the motor vehicle is loaded, the force controller KR can, for example, be reactivated by setting the first control signal $\lambda_{FCtrl}$ to one, and the brake can generate a higher clamping force again. This can prevent the vehicle from rolling away in an undesirable manner.

If the controller selection RS establishes that the target clamping force $F_{Target}$ is changed, for example more than one specified threshold value is changed, the holding phase is ended and the force controller KR is reactivated by setting the first control signal $\lambda_{FCtrl}$ to one. The force control can then be executed again in the usual way.

The mentioned steps of the method can be executed in the order indicated. However, they can also be executed in a different order, insofar as is technically appropriate. In one of its embodiments, for example with a specific combination of steps, the method can be executed in such a way that no further steps are executed. However, in principle, further steps can also be executed, including steps that have not been mentioned.

It is pointed out that features may be described in combination in the claims and in the description, for example in order to facilitate understanding, even though these can also be used separately from one another. A person skilled in the art will recognize that such features, independently of one another, can also be combined with other features or combinations of features.

Dependency references in dependent claims may characterize preferred combinations of the respective features but do not exclude other combinations of features.

The invention claimed is:

1. A method for holding a motor vehicle using an electrically actuated brake comprising:
    applying the brake until a target force is reached;
    applying a negative preset value for a target angular velocity for a motor torque of an electric actuator of the brake;
    monitoring an actual angular velocity of the actuator with an actuator speed controller while applying the negative preset value; and
    applying a quiescent value for the target angular velocity when a magnitude of the actual angular velocity exceeds a threshold value.

2. The method as claimed in claim 1, wherein the actuator speed controller has at least one integral part.

3. The method as claimed in claim 1, wherein the actuator speed controller is a proportional-integral controller.

4. The method as claimed in claim 1, wherein a magnitude of the present value is at most one revolution per minute.

5. The method as claimed in claim 1, wherein the quiescent value is zero.

6. The method as claimed in claim 1, wherein the target angular velocity is one of the present value, originates from a force controller and originates from a position controller depending on an operating state.

7. The method as claimed in claim 6, wherein at least one of the force controller and the position controller are a controller with a proportional action.

8. The method as claimed in claim 1, further comprising limiting the motor torque with a limiter, at the output end of the actuator speed controller such that the motor torque has at least one of a lower value and an upper value.

9. The method as claimed in claim 1, further comprising limiting the target angular velocity with a limiter at the input end of the actuator speed controller such that the target anfular velocity has at least one of a lower value and an upper value.

10. The method as claimed in claim 1, further comprising ending the holding process when one of a target clamping force a target actuator position is changed.

11. The method as claimed in claim 1, further comprising:
    wherein the method is executed in response to an actual clamping force exceeding an activation threshold value, differing from a target clamping force by a specified threshold value and being constant within a tolerance range at least for a predetermined period of time, and/or
    which is executed in response to an actual position exceeding a further activation threshold value, differing from a target position by a specified threshold value and being constant within a tolerance range at least for a predetermined period of time.

12. An electrically actuated brake comprising:
    an electric actuator, and
    an actuator speed controller with instructions for;
    applying the brake until a target force is reached;
    applying a negative preset value for a target angular velocity for a motor torque of the electric actuator of the brake;
    monitoring an actual angular velocity of the actuator with an actuator speed controller while applying the negative preset value; and
    applying a quiescent value for the target angular velocity when a magnitude of the actual angular velocity exceeds a threshold value.

13. The brake as claimed in claim 12, wherein the actuator speed controller has at least one integral part.

14. The brake as claimed in claim 12, wherein the actuator speed controller is a proportional-integral controller.

15. The brake as claimed in claim 12, wherein a magnitude of the preset value is at most one revolution per minute.

16. The brake as claimed in claim 12, wherein he quiescent value is zero.

17. The brake as claimed in claim 12, wherein the target angular velocity is one of the preset value, originates from a force controller and originates from a position controller depending on an operating state.

18. The brake as claimed in claim 17, wherein at least one of the force controller and the position controller are a controller with a proportional action.

19. The brake as claimed in claim 12, further comprising instructions for limiting the motor torque with a limiter, at the output end of the actuator speed controller such that the motor torque has at least one of a lower value and an upper value.

20. The brake as claimed in claim 12, further comprising instructions for limiting the target angular velocity with a limiter at the input end of the actuator speed controller such that the target angular velocity has at least one of a lower value and an upper value.

21. The brake as claimed in claim 12, further comprising ending the holding process when one of a target clamping force a target actuator position is changed.

22. The brake as claimed in claim 12, wherein the controller executes the instructions in response to an actual clamping force exceeding an activation threshold value, differing from a target clamping force by a specified threshold value and being constant within a tolerance range at least for a predetermined period of time; and wherein the controller executes the instructions in response to an actual position exceeding a further activation threshold value, differing from a target position by a specified threshold value and being constant within a tolerance range at least for a predetermined period of time.

* * * * *